(12) United States Patent
Vijverberg

(10) Patent No.: US 6,647,919 B2
(45) Date of Patent: Nov. 18, 2003

(54) DEVICE FOR DETERMINING THE POSITION OF A TEAT OF AN ANIMAL

(75) Inventor: Hèlèna geralda Maria Vijverberg, Maassluis (NL)

(73) Assignee: Lely Enterprises A.G., Zug (CH)

( * ) Notice: Subject to any disclaimer, the term of this patent is extended or adjusted under 35 U.S.C. 154(b) by 0 days.

(21) Appl. No.: 10/128,665

(22) Filed: Apr. 24, 2002

(65) Prior Publication Data

US 2002/0152963 A1 Oct. 24, 2002

(51) Int. Cl.[7] .............................. A01J 3/00; G06M 7/00
(52) U.S. Cl. ..................................... 119/14.08; 250/221
(58) Field of Search ..................... 119/14.01, 14.02, 119/14.03, 14.08, 14.14; 250/221

(56) References Cited

U.S. PATENT DOCUMENTS

| | | | | |
|---|---|---|---|---|
| 4,726,322 A | * | 2/1988 | Torsius ..................... | 119/14.14 |
| 5,769,023 A | * | 6/1998 | van der Lely et al. .... | 119/14.02 |
| 5,934,220 A | * | 8/1999 | Hall et al. ................ | 119/14.08 |
| 6,118,118 A | * | 9/2000 | van der Lely et al. .... | 119/14.08 |
| 6,213,051 B1 | * | 4/2001 | Fransen ..................... | 119/14.01 |

* cited by examiner

Primary Examiner—Charles T. Jordan
Assistant Examiner—Judith A. Nelson
(74) Attorney, Agent, or Firm—Penrose Lucas Albright

(57) ABSTRACT

A device for determining the spatial position of an animal's teat having a first transmitter element for emitting a first ray or beam of rays in a first sub-area of a space which includes the presence of the teat, and a second transmitter element differing from the first transmitter element for emitting a second ray or beam of rays in a second sub-area in such space, the first sub-area and the second sub-area overlapping by a few degrees where the join. A first receiver element receives a reflection of the first ray or beam of rays and a second receiver element differing from the first receiver element receives a reflection of a second ray or beam of rays. A mirror having reflections or both of the rays or beams of rays from the transmitter elements. At least three of the reflective sides of the mirror have different angles relative to the axis of rotation so that the teat is essentially simultaneously detected at different levels, the location of the teat in general and its disposition at the different levels being determined by triangulation.

36 Claims, 2 Drawing Sheets

DEVICE FOR DETERMINING THE POSITION OF A TEAT OF AN ANIMAL

FIELD OF THE INVENTION

The invention relates to a device for determining the spatial position of a teat of an animal.

BACKGROUND OF THE INVENTION

Such a device is known from the International Patent Application No. 98/00460, of Fransen et al, published Feb. 25, 1999, WO 99/09430, and its equivalent U.S. Pat. No. 6,118,118, of Van der Lely et al, which issued Sep. 12, 2000. although this device functions satisfactorily and is adapted to determine highly accurately the position of a teat, in some cases, such as for tilting teats, it appears to be desirable to improve the determination of the position.

SUMMARY OF THE INVENTION

It is an object of the invention to provide a device for determining the spatial position of a teat of an animal, said device enabling an improved determination of the position.

For that purpose, according to a first aspect of the invention, a device for determining the spatial position of a teat animal which comprises a transmitted element for transmitting a first ray or beam of rays in a first sub-area of space and a further transmitter element for emitting a second ray or beam of rays to a second sub-area of space, a first receiver to receive a reflection of the first ray or beam of rays, a second receiver element arranged to receive a reflection of the second ray or beam of rays, a mirror that rotates about an axis of rotation for directing the ray or beam of rays from each transmittal element in a relevant plane of the relevant sub-area of space for directing a ray or beam of rays from the relevant receiver element, or doing both, and means for directing the ray or beam or rays from each transmittal element in at least two spaced-apart relevant position determination surfaces of the relevant sub-area of space.

Because at least two spaced-apart position determination surfaces, a more accurate determination of the position is possible due to the fact that there is also obtained a determination of the position in height of the teat, so that tilt of the teat can be determined.

In an embodiment of a device according to the invention, the mirror is constituted by a polygon having at least two reflective surfaces, at least one of the reflective surfaces being at a different angle relative to the axis of rotation than one of the remaining reflective surfaces. Due to the fact that a polygon is used, there is obtained in a simple constructive manner a synchronisation of the rotation of the reflective surfaces. As a result thereof the further processing of the data is also simplified.

The device is preferably provided with a means for directing the ray or beam of rays emanating from each transmitter element in three spaced-apart relevant position determination surfaces of the relevant sub-area of the space. In practice it has appeared that the use of three position determination surfaces in almost all cases suffices for determining the position of a teat.

In an embodiment of a device according to the invention the mirror is constituted by a pentagon having five reflective surfaces, one of the reflective surfaces being parallel to the axis of rotation, two of the reflective surfaces being at an equal positive angle relative to the axis of rotation, and the remaining two reflective surfaces being at an equal negative angle relative to the axis of rotation. Thus there are obtained three position determination surfaces, the two outer surfaces being scanned twice at one rotation of the pentagon. Thus there can be obtained a very accurate determination of the position, in particular tilt determination, of a teat. It is especially advantageous when the positive and negative angle are between approximately 3 degrees and approximately 13 degrees.

In an alternative embodiment of a device according to the invention, two of the reflective surfaces are parallel to the axis of rotation, one of the reflective surfaces being at a first angle relative to the axis of rotation, and the remaining two reflective surfaces being at a second angle relative to the axis of rotation. The first angle is preferably between approximately 1 degree and approximately 7 degrees, whereas the second angle is preferably between approximately 1 degree and approximately 20 degrees. An especially accurate determination of the position of a teat is obtained when the second angle is at least approximately twice as great as the first angle.

The invention further relates to a device for determining the position of a teat of an animal relative to the device, said device being provided with a transmitter element for emitting a ray or beam of rays, with at least one receiver element arranged to receive a ray or beam of rays reflected by a teat, and with at least one reflective surface which is rotatable about an axis of rotation for directing the ray or beam of rays emanating from the transmitter element consecutively to a teat or for directing the ray or beam of rays emanating from a teat to the receiver element, or doing both, characterized in that there are provided means for changing the orientation of the reflective surface relative to the teat during rotation of the reflective surface. Due to the fact that there are provided means for changing the orientation of the reflective surface relative to the teat during rotation of the reflective surface, during rotation there are obtained several surfaces in which the ray respectively beam of rays is emitted. Due to this, besides determination of the position, also determination of the position in height of a teat is possible, so that tilt of the teat can be determined. The synchronisation of the change and the data obtained therefrom may be realised by means of a computer, so that processing of the data can take place accurately. It will be obvious that, on the one hand, the change in orientation may be gradual, that is continuous, but that, on the other hand, a discrete change of orientation may take place as well.

The means are preferably suitable for changing the orientation of the reflective surface relative to the axis of rotation. Additionally or alternatively the means are suitable for changing the orientation of the axis of rotation. Such a change may take place e.g. by means of an eccentric suspension or a curve disc or the like.

The invention further relates to a device for determining the position a teat of an animal relative to the device, said device being provided with a transmitter element for emitting a ray or beam of rays, with at least one receiver element arranged to receive a ray or beam of rays reflected by a teat, and with a mirror which is rotatable about an axis of rotation for directing the ray or beam of rays emanating from the transmitter element consecutively to a teat or for directing the ray or beam of rays emanating from a teat to the receiver element, or doing both, characterized in that the mirror is constituted by a polygon having at least two reflective surfaces, at least one of the reflective surfaces being at a different angle relative to the axis of rotation than one of the remaining reflective surfaces. Due to the fact that there are at least two reflective surfaces, at least one of the reflective surfaces being at a different angle relative to the axis of rotation than one of the remaining reflective surfaces, there are obtained at least two spaced-apart surfaces in which the ray or respectively beam of rays is emitted. Due to this, besides determination of the position, also determination of the position in height of a teat is possible, so that tilt of a teat can be determined. It will be appreciated that the orientation of the reflective surfaces relative to the axis of rotation may be fixed as well as variable. Further also in this situation the orientation of the axis of rotation may be variable.

An optimal determination of the position of teats appears to be possible when the mirror is constituted by a pentagon having five reflective surfaces.

A particularly accurate determination of not only the position but also of tilt is obtained when one of the reflective surfaces is parallel to the axis of rotation, two of the reflective surfaces are at an equal positive angle relative to the axis of rotation, and the remaining two reflective surfaces are at an equal negative angle relative to the axis of rotation. As a result thereof there are obtained three detection surfaces, the outer surfaces being created by rays or beams of rays emanating from two reflective surfaces, and thus providing a double measurement. The positive and negative angle are preferably between approximately 3 degrees and approximately 13 degrees.

Alternatively there is obtained a particularly accurate determination of the position and the tilt when two of the reflective surfaces are parallel to the axis of rotation, one of the reflective surfaces is at a first angle relative to the axis of rotation, and the remaining two reflective surfaces are at a second angle relative to the axis of rotation.

The first angle is preferably between approximately 1 degree and approximately 7 degrees. The second angle is preferably between approximately 1 degrees and approximately 20 degrees. Accurate data when the second angle is at least approximately twice as great as the first angle.

For the purpose of accurately determining the position of two teats disposed behind each other relative to the device, the device further comprises means for scanning the space in at least two sub-areas substantially simultaneously. This is preferably obtained in that the device is provided with means for directing at least two separate rays or beams of rays to different areas in that space. When the transmitter elements are alternately switched on and off, a processor which processes the data obtained from the two transmitter elements will suffice. For the purpose of obtaining a simplified assembly of the device, the transmitter element, the receiver element and the directional element are mounted on a bottom plate so as to form a unit. The device is then assembled by accommodating the bottom plate including elements in a housing having a window for letting through the ray or beam of rays emanating from the transmitter element or from a teat, or from both, shock-absorbing means being provided between the housing and the bottom plate. As a result thereof shocks exerted on the housing are not transferred or are transferred to a lesser extent to the sensitive components of the device.

To prevent undesired reflection, the window is designed as a flat window and is at an angle relative to the normal on the bottom plate.

The device is preferably provided with a dirt detector for detecting contamination of the window. When contamination is detected, the dirt detector may supply a signal to the operator of the device or to an automatic device for cleaning the window. Such a dirt detector may be constituted by separate receiver elements detecting the rays or beams of rays reflected by the window. The device is preferably provided with anti-condensation means for preventing or removing or reducing condensation on the inner side of the window, so that the rays or beams of rays are not affected when passing through the window. The anti-condensation means preferably comprise a heating means which is integrated into the window. The heating means is particular active continuously, in other words, independently of the environmental conditions. As a result thereof the reflective surface, independently of quickly varying environmental conditions, is always free from condensation, which enhances the determination of the position.

Consequently, the invention also relates to a device for determining the position of a teat of an animal relative to the device, said device being provided with a transmitter element for emitting a ray or beam of rays, with at least one receiver element arranged to receive a ray or beam of rays reflected by a teat, and with at least one reflective surface which is rotatable about an axis of rotation for directing the ray or beam of rays emanating from the transmitter element consecutively to a teat or for directing the ray or beam of rays emanating from a teat to the receiver element, or for doing both, characterized in that the device comprises a housing having a window for letting through the ray or beam of rays emanating from the transmitter element or emanating from a teat, or both the device being provided with a heating means which is integrated into the window, the heating means being active continuously, in other words independently of the environmental conditions.

A further protection against moisture in the housing is obtained when, except the window, the inner side of the walls of the housing is provided with an aluminium coating.

The device according to the invention is especially suitable for use in a milking device for milking animals, such as cows, provided with at least one milking compartment comprising at least one milking robot having a robot arm for automatically connecting teat cups to the teats of an animal to be milked, the device being used for determining the position of a teat relative to a teat cup.

A milking device in which the device for determining the position of the teat is disposed in a shock-resistant manner is obtained when the housing is covered with a lid that is supported by the robot arm. The lid is preferably composed of stainless steel.

BRIEF DESCRIPTION OF THE DRAWINGS

The invention will be explained in further detail with the aid of non-limiting exemplary embodiments with reference to the accompanying drawings in which.

DETAILED DESCRIPTION OF THE PREFERRED EMBODIMENTS

Figure 1:
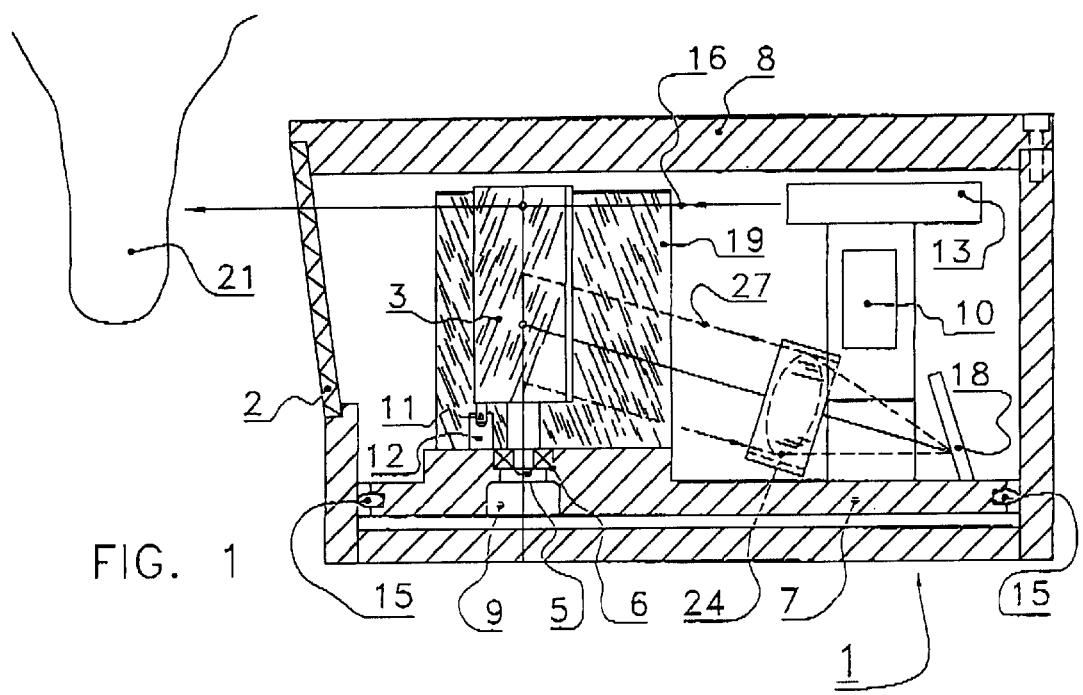
FIG. 1 is a schematic cross-sectional side view of an embodiment of the device according to the invention.
Figure 2:
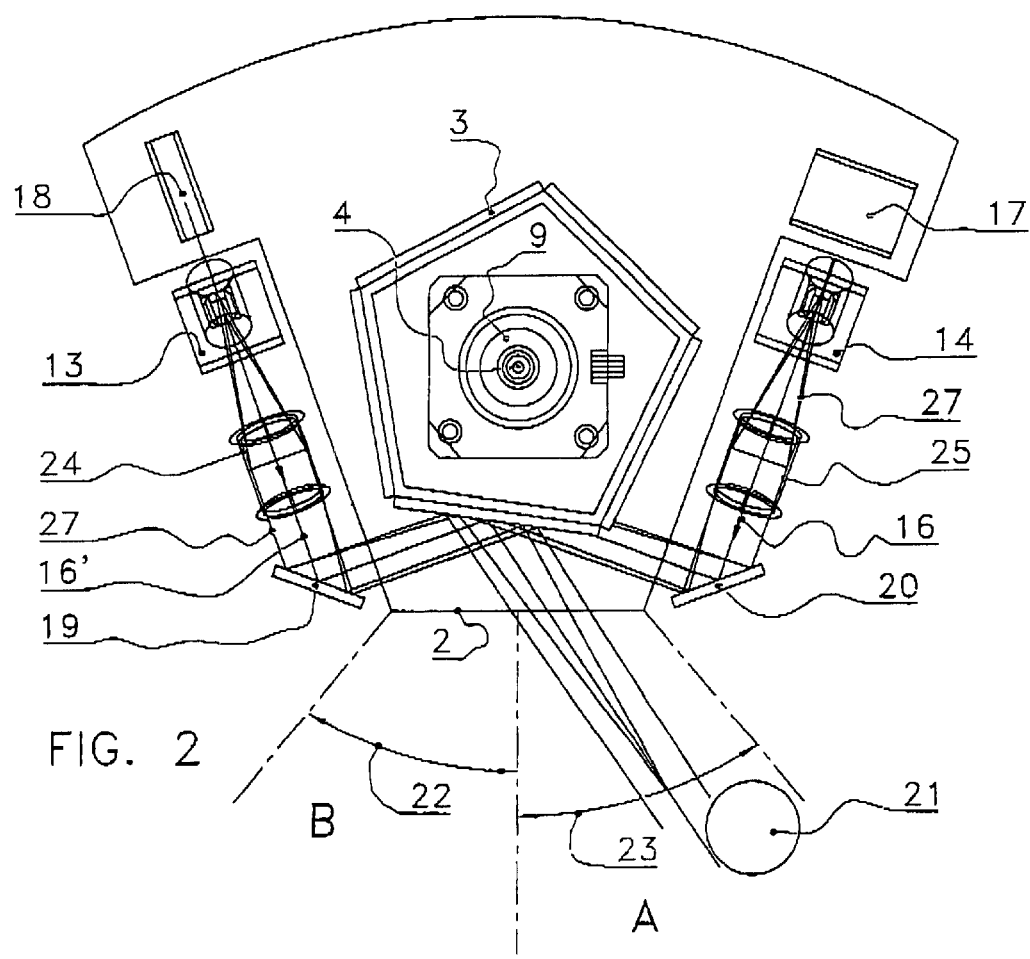
FIG. 2 is a schematic plan view of the device shown in FIG. 1.

The embodiment shown in FIGS. 1 and 2 comprises a housing 1 with side walls and a bottom made of material which is impenetrable for the relevant ray or beam of rays, such as light-proof material, for example, laser (IR-) light, having at the front side an aperture or window which is sealed with a plate which is penetrable for the relevant ray or beam or rays, such as a glass plate 2. Said plate may also be composed of a suitable synthetic material. Behind the glass plate 2, a directional element in the form of a mirror is arranged that has a reflective surface which reflects the relevant ray or beam of rays. According to an aspect of the invention, one reflective surface will suffice when there are provided means for changing the orientation of the reflective surface relative to the object. This may be provided, for example, by mounting the axis of rotation 4 in a bearing, said bearing performing a reciprocating movement in the direction towards, and away from the window. Such a movement may, for example, be obtained by an eccentric or a curve disc. The invention will be described hereinafter with reference to a mirror in the form of a polygon 3 having at least three reflective surfaces which reflect the relevant ray or beam of rays. Polygon 3 is in particular constituted by a pentagon having five reflective surfaces.

Polygon 3 is disposed so as to be rotatable about its axis of rotation 4 and is bearing-supported for that purpose at one side with a shaft end 5 in a bearing 6 in a bottom plate 7. A lid 8, preferably of stainless steel, closes the housing 1. In this embodiment the polygon 3 is driven directly via a stepper motor 9. Polygon 3 rotates preferably continuously in the same direction at an at least substantially constant speed, so that its drive is lightly loaded and insensitive to wear.

As schematically shown in FIG. 2, on both sides of the polygon 3 arranged a transmitter element in the form of a laser diode 13, 14. Below each transmitter element 13 and 14 there is disposed a respective receiver element 17, 18, here designed as a so-called CCD. The wavelength of the two diodes 13, 14 is preferably in the range of 600–900 nanometers, more preferably in the range of 780–830 nanometers, the wavelengths of the transmitter elements 13 and 14 preferably mutually differing so that no interference occurs when the rays or beams of rays 16 emanating from the transmitter elements 13 and 14 cross each other. Further the wavelength difference is such that the sensitiveness of each receiver element 17 and 18 can be attuned in a reliable manner to the ray of beam of rays 16 emanating from the respective transmitter element 13 or 14, in order to prevent interference, also in this respect, as much as possible. Alternatively, instead of the wavelength also the transmission amplitude between the transmitter elements 13 and 14 may differ. There may also be a difference in modulation of the emitted signals. In addition it is also possible to direct the rays or beams of 10 rays 16 emanating from the transmitter elements 13 and 14 at different heights through the housing 1, so that they hit the directional element 3 in different height regions, thus also preventing interference. Also other differences in characteristics of the two rays or beams of rays 16 are 15 possible for counteracting inconvenient effects of interference, such as by making use of combinations of two or more of the aforementioned measures.

The receiver elements 17, 18 are preferably constituted by a diode sensor. In this situation a receiver element may have a uni-dimensional or two-dimensional series of adjacent detector elements. Each detector element is sensitive to different radiation, and in case of exposure to that radiation, supplies a detection signal corresponding with the intensity of that radiation to an evaluation device 10. Each receiver element 17 and 18 is attached to the bottom plate 7.

When the lasers 13 and 14 are switched on and off separately, the capacity of the evaluation device 10 remains limited, while nevertheless an accurate determination of the position is possible. So evaluation device 10 processes each time only data from one of the lasers.

In this situation the directional element 3 is shared by the two rays or beams of rays.

After leaving the respective transmitter element 13 and 14, the substantially emitted rays or beams of rays, which are parallel to each other, hit a respective deflecting element 19 or 20 for being deflected towards the directional element 3 which is arranged between said deflecting elements 19 and 20. In this situation each deflecting element is constituted by a reflector 19 or 20 including an angle of approximately 30 degrees with the incident ray or beam of rays 16. Alternatively there may also be used e.g. a respective prism or bundle of glass fibs cables.

Between each deflecting element 19 and 20 and the respective receiver element 17 and 18 a focusing element or convergence element is arranged, in this embodiment constituted by a corresponding lens 24 or 25, the function of which will be elucidated hereinafter. The directional element is adapted to direct each ray or beam of rays 16 over a respective angle sector 22 and 23 into the space, wherein at teat 21 may be present, so as to determine for example the position of a teat 21 of an animal to be milked in that space. In the situation of a pentagon having five reflective surfaces and two lasers each covering a sector, the angle is approximately 72 degrees for each angle sector 22 and 23. Angle sectors 22 and 23 may overlap each other, for example over 2 degrees, so that the total angle area 29 to be scanned in the space amounts to 140 degrees. Because of the fact that each ray or beam of rays 16 is constituted by a laser light, the angle sectors, perpendicular to their plane, are at least substantially non-diverging, except some scattered radiation.

The radiation reflected from the space or scattered radiation of the ray or beam of rays 16 is received by the directional element 3 as a reflection beam 27 and directed to the corresponding receiver element 17 or 18 via the respective deflecting element 19 or 20. The reflection beam 26 and 27 then passes through the respective lens 24 or 25, so that the relatively wide reflection beam 27 is concentrated on a local area of the receiver element. Because in this embodiment the lens 24 and 25 has a fixed focal distance and is, as is apparent from FIG. 3, at an angle relative to a robot arm, and also because the lens 24 and 25 is attached to the bottom plate 7 and is thus fixedly arranged relative to the respective receiver element 17 or 18, the place where the teat 21 is projected on the receiver element 17 or 18 is in relation to the position of the teat 21 in the space. Each receiver element 17 and 18 supplies a corresponding signal, in dependence of the nature of the signal and its further processing, possibly by intervention of an analog-to-digital converter, to an evaluation device 10 (also attached to the bottom plate 7), for example, constituted by a microprocessor. The principle of scanning the teat 21 by means of a ray or beam of rays to be directed consecutively to different areas in the space, and the processing of the signals obtained by means of the sensor device are known per se.

By updating the position of the directional element 3 such as by linking the motor 9 to a pulse generator which generates a pulse per portion of the revolution, such as each 1 degree, by simple calculation in, for example a microprocessor, the position of the directional element 3 at the moment when a ray or beam of rays reflected by the teat 21 hits the receiver element 17 can be deduced. When the teat 21 is located in the other angle sector 22, the ray or beam of rays will emanate of course from the transmitter element 14 and hit the receiver element 17. For the purpose of determining a zero position of the polygon the latter is provided with a position indicator, for example a protrusion 11 the position is determined by a detector 12, for example constituted by a light detector. When the protrusion 11 passes along detector 12 there is supplied a signal to evaluation device 10. The signal from the detector 12 may also be used for safety purposes. For example, when during a to be pre-set period the detector 12 does not detect passage of the protrusion, it may be assumed that polygon 3 is not rotating, and a subsequent automatic switching off of the lasers will improve the safety.

For detecting, for example, dirt on the window 2, one or both rays or beams of rays 16 may be directed such that, in a pre-determined position of the directional element 3, a ray or beam of rays 16 without leaving the device returns to a (possibly) additional (non-shown) receiver element via the directional element 3, so that contamination if any can be measured.

As shown in FIG. 1, the glass plate 2 is positioned such that it is disposed of an angle for counteracting for counteracting inconvenient reflection as much as possible.

Figure 3:
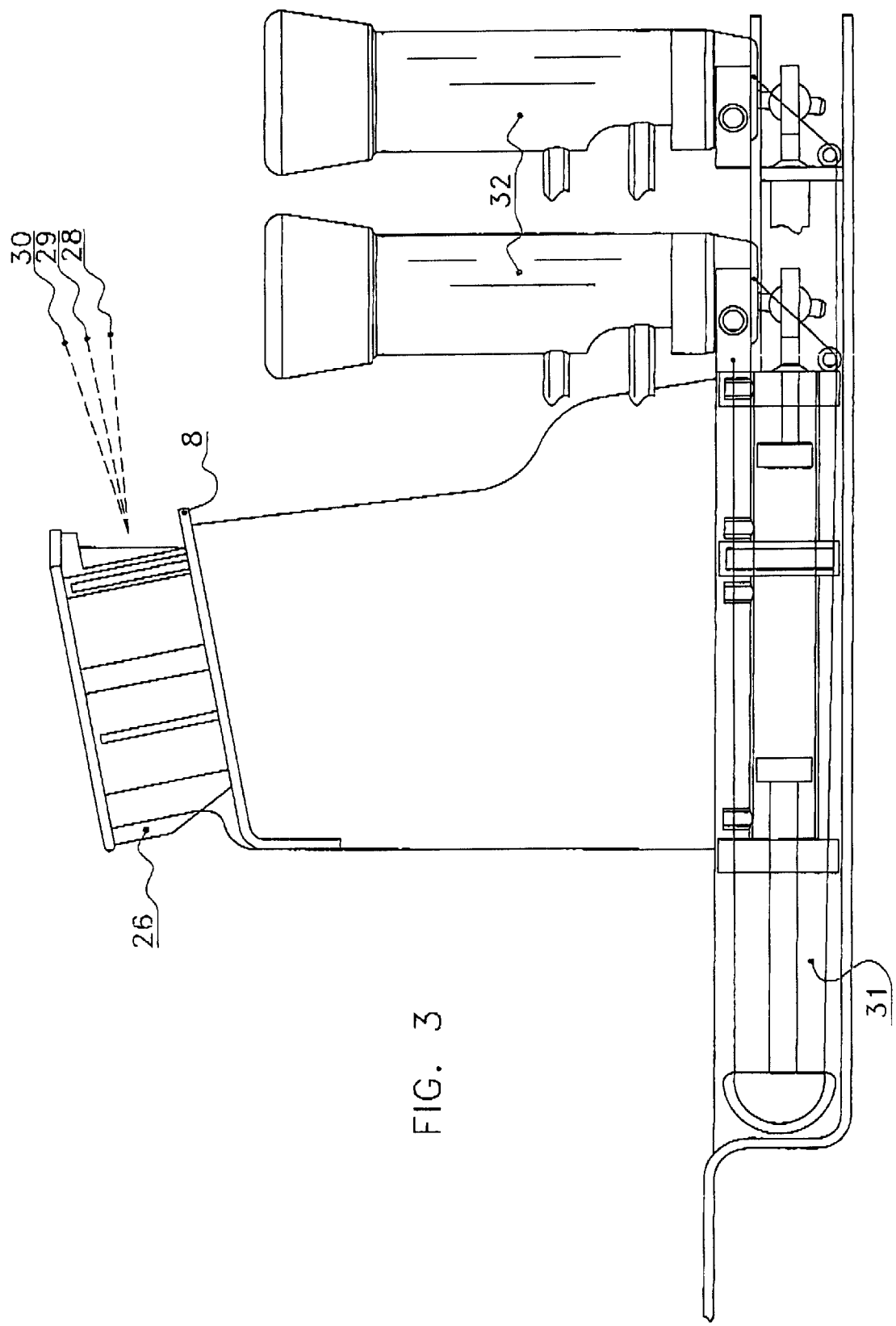
FIG. 3 is a schematic side elevation view of a milking device provided with a device according to FIGS. 1 and 2.

As schematically shown in FIG. 3, there are created three position determination surfaces 28, because one of the reflective surfaces of the pentagon 3 is parallel to the axis of rotation 4, two of the reflective surfaces are at an equal positive angle relative to the axis of rotation 4, and the remaining two reflective surfaces are at an equal negative angle relative to the axis of rotation 4. By means of these three surfaces 28, 29, 30 the position of the teat 21, and at the same time the tilt thereof, can be determined more accurately. It will be apprecated that the invention is not limited to generating three position determination surfaces, but that an accurate determination of the position is already possible with two (or more than three) position determination surfaces. However, the use of three position determination surfaces has proved to be sufficient in practice. Moreover, the number of reflective surfaces generated by the position determination surfaces is adjustable according to the requirements. For example, for three position determination surfaces three reflective surfaces are sufficient. Thus the invention in all its aspects provides the possibility of generating at least two spaced-apart position determination surfaces with the aid of one single transmitter element, the rays or beams of rays to be emitted by the two transmitter elements covering together the space to be scanned on a teat. In this manner it is possible to measure simultaneously the position of a teat in sub-area A by one transmitter element and the position of a teat in sub-area B by the other transmitter element.

Taking into account the usual distance between the teats and the dimensions of the teats, the positive and negative angle is between approximately 3 degrees and approximately 13 degrees.

In an alternative embodiment in which also three position determination surfaces 28, 29 and 30 are created, two of the reflective surfaces are parallel to the axis of rotation, one of the reflective surfaces is at a first angle relative to the axis of rotation, and the remaining two reflective surfaces are at a second angle relative to the axis of rotation. In this situation the first angle is between approximately 1 degree and approximately 7 degrees, and the second angle is between approximately 1 degrees and approximately 20 degrees. The second angle is preferably at least approximately twice as great as the first angle, the second angle being preferably approximately 5.2 degrees and the first angle being preferably approximately 2.6 degrees. Because of the fact that the bottom plate 7 carries the relevant elements of the device, said bottom plate including elements can easily be assembled in the housing 1.

Between the housing 1 and the bottom plate 7 there are provided shock-absorbing means 15, such as rubber rings.

The device is preferably provided with anti-condensation means for preventing or, removing or reducing condensation, or any combination thereof on the inner side of the window, so that the rays or beams of rays are not affected when passing through the window. The anti-condensation means preferably comprise a heating which is integrated into the window and which is active continuously, in other words independently of the environmental conditions.

A further protection against moisture in the housing is obtained when the inner side of the walls of the housing, except the window, is provided with an aluminium coating.

FIG. 3 shows schematically part of the milking device provided with a device according to FIGS. 1 and 2. The milking device is provided with at least one milking compartment comprising at least one milking robot having a robot arm 31 for automatically connecting teat cups 32 to the teats of an animal to be milked. A scanning device 26 for determining the position of a teat relative to one of the teat cups 32 comprises a device as described with reference to FIGS. 1 and 2. The scanning device is at an angle relative to the longitudinal direction of the robot arm 31 for enabling determination of position in a simple manner, on the basis of the known triangulation principle.

Due to the fact that the lid 8 is supported by the robot arm 31 the scanning device 26 for determining the position of the teat is disposed so as to be shock-resistant.

The lid, as previously stated is preferably composed of stainless steel.

having disclosed the preferred embodiments of my invention, it is to be understood that it is capable of other adaptations and modifications within the scope of the following claims.

Having thus disclosed my invention, what I claim as new and to be secured by Letters Patent of the United States of America is:

1. A device for determining the spatial position of an animal's teat, said device comprising a first transmitter element for emitting a first ray or beam of rays in a first sub-area of a space, a second transmitter element differing from said first transmitter element for emitting a second ray or beam of rays in a second sub-area of said space, said space consisting essentially of said first sub-area and said second sub-area, a first receiver element arranged to receive a reflection of said first ray or beam of rays, a second receiver element differing from said first receiver element arranged to receive a reflection of said second ray or beam of rays, a mirror rotatable about an axis of rotation for directing said ray or beam of rays emanating from each said transmitter element or their reflections or both to a relevant said receiver element, said mirror being provided with biasing means for vertically biasing the direction of said ray of beams or rays or the reflections thereof as received by a said relevant receiver element whereby such relevant receiver element receives information as to the essentially simultaneous positions of two vertically spaced apart locations of said teat.

2. A device in accordance with claim 1, wherein said mirror is a polygon having at least two reflective surfaces, at least one of said reflective surfaces being at a different angle relevant to the axis of rotation of said mirror than another of said reflective surfaces.

3. A device in accordance with claim 1, wherein said mirror comprises a polygon having at least three reflective surfaces which are at different angles relative to each other relative to the axis of rotation of said mirror.

4. A device in accordance with claim 3, wherein said mirror is a pentagon having five reflective surfaces, one of said reflective surfaces being parallel to said axis of rotation, two of said reflective surfaces being at an equal positive angle relative to said axis of rotation, and the remaining two reflective surfaces being at equal negative angles relative to said axis of rotation.

5. A device as claimed in claim 4, wherein said positive and said negative angles are between about three degrees and thirteen degrees.

6. A device in accordance with claim 3, wherein said mirror is a pentagon having five reflective surfaces, two of said reflective surfaces being parallel to said axis of rotation, one of said reflective surfaces being at a first angle relative to said axis of rotation and the remaining two reflective surfaces being at a second angle relative to said axis of rotation.

7. A device in accordance with claim 6, wherein said first angle is between about one degree and seven degrees.

8. A device in accordance with claim 7, wherein said second angle is between about one degree and twenty degrees.

9. A device in accordance with claim 7, wherein said second angle is at least about twice as great as said first angle.

10. A device for determining the position of an animal's teat relative to the device which comprises a transmitter element for emitting a ray or beam of rays, at least one receiver element arranged to receive a ray or beam of rays reflected by said teat, at least one reflective surface which is rotatable about an axis of rotation for directing said ray or beam of rays emanating from said transmitter element to said teat or the reflections therefrom to said receiving element or both, an orientation changing means for changing the orientation of said reflective surface relative to said teat while said reflective surfaces are being rotated wherein essentially simultaneous positions of said teat are determined at two vertically spaced apart locations thereof.

11. A device in accordance with claim 10, wherein said orientation changing means changes the orientation of said reflective surface relative to said axis of rotation.

12. A device in accordance with claim 10, wherein said orientation changing means changes the orientation of said axis of rotation.

13. A device for determining the position of an animal's teat relative to the device, said device comprising a transmitter element for emitting a ray or beam of rays wherein said teat is present, at least one receiver element arranged to receive a ray or beam of rays reflected by said teat, a mirror which is rotatable about an axis of rotation for directing said ray or beam of rays emanating from said transmitter element to said teat or reflections therefrom to said receiver element, said mirror comprising a polygon having at least two reflective surfaces, at least one of said reflective surfaces being at a different angle relative to said axis of rotation than another of said reflective surfaces.

14. A device in accordance with claim 13, wherein said mirror comprises a pentagon having five reflective surfaces.

15. A device in accordance with claim 14, wherein one of said reflective surfaces is parallel to said axis of rotation, two of said reflective surfaces are at equal positive angles relative to said axis of rotation, and the remaining two reflective surfaces are at equal negative angles relative to said axis of rotation.

16. A device in accordance with claim 15, wherein said positive and said negative angles are between about three degrees and thirteen degree.

17. A device in accordance with claim 14, wherein two of said reflective surfaces are parallel to said axis of rotation, one of said reflective surfaces is at a first angle relative to said axis of rotation, and said two remaining reflective surfaces are at a second angle relative to said axis of rotation.

18. A device in accordance with claim 17, wherein said first angle is between approximately one degree and seven degrees.

19. A device in accordance with claim 18, wherein said second angle is between approximately one degree and twenty degrees.

20. A device in accordance with claim 17, wherein said second angle is at least about twice as great as said first angle.

21. A device in accordance with claim 13, comprising scanning means for scanning said space in at least two essentially different spatial areas substantially simultaneously.

22. A device in accordance with claim 21, comprising directing means that directs at least two separate rays or beams of rays to said different spatial areas.

23. A device in accordance with claim 22, comprising a separate transmitter element and a separate receiver element for each separate ray or beam of rays.

24. A device in accordance with claim 23, wherein said transmitter elements are alternately switched on and off.

25. A device in accordance with claim 13, comprising a bottom plate, said receiver element, said transmitter element, and a directional element being mounted on said bottom plate.

26. A device in accordance with claim 25, comprising a housing having a window through which said ray or beam of rays can be transmitted and shock-absorbing means disposed between said housing and said bottom plate.

27. A device in accordance with claim 26, wherein said window is flat and is at an angle other than perpendicular to said bottom plate.

28. A device in accordance with claim 26, comprising a dirt detector for detecting contamination of said window.

29. A device in accordance with claim 26, comprising anti-condensation means for constraining condensation on the inner side of said window.

30. A device in accordance with claim 29, wherein said anti-condensation means comprises heating means integrated into said window.

31. A device in accordance with claim 30, wherein said heating means is activated continuously independently of environmental conditions.

32. A device for determining the position of an animal's teat relative to the device comprising a transmitter element for emitting a ray or beam of rays, at least one receiver element arranged to receive a ray or beam of rays reflected by said teat, at least one reflective surface which is rotatable about axis of rotation for reflecting said ray or beam of rays emanating from said transmitter element to a teat or reflections therefrom emanating from said teat to said receiver element, a housing, a window in said housing through which said ray or said beam of rays emanating from said transmitter element or reflected from said teat pass, heating means integrated into said window, said heating means being continuously activated independently of environmental conditions.

33. A device in accordance with claim 32, said housing comprises walls, the inner sides of said walls being provided with an aluminum coating.

34. A device in accordance with claim 10, in combination with a milking compartment and comprising at least one milking robot having a robot arm for automatically connecting teat cups to said animal's teats including said teat of said animal to be milked and a scanning device for determining the position of each of said teats relative to a corresponding teat cup.

35. A device in accordance with claim 29, comprising a robot arm, a lid that covers said housing, said lid being supported by said robot arm.

36. A device in accordance with claim 35, wherein said lid is composed of stainless steel.

* * * * *